United States Patent
Kull

(10) Patent No.: US 7,016,146 B2
(45) Date of Patent: Mar. 21, 2006

(54) LOW POWER SPINDLE MOTOR WITH A FLUID DYNAMIC SPOOL BEARING

(75) Inventor: Andreas Kull, Donaueschingen (DE)

(73) Assignee: Minebea Co., Ltd., (JP)

(*) Notice: Subject to any disclaimer, the term of this patent is extended or adjusted under 35 U.S.C. 154(b) by 144 days.

(21) Appl. No.: 10/385,909

(22) Filed: Mar. 11, 2003

(65) Prior Publication Data

US 2003/0174439 A1 Sep. 18, 2003

Related U.S. Application Data

(60) Provisional application No. 60/363,821, filed on Mar. 12, 2002.

(30) Foreign Application Priority Data

Aug. 19, 2002 (DE) ............... 102 37 848

(51) Int. Cl.
G11B 17/02 (2006.01)
(52) U.S. Cl. .................... 360/99.08
(58) Field of Classification Search ........... 360/99.08, 360/98.07; 310/90; 384/107, 113–115, 118, 384/119, 132, 110
See application file for complete search history.

(56) References Cited

U.S. PATENT DOCUMENTS

| | | |
|---|---|---|
| 3,399,000 A | 8/1968 | Remmers |
| 4,772,136 A | 9/1988 | Carter |
| 4,795,275 A | 1/1989 | Titcomb et al. |
| 5,142,173 A | 8/1992 | Konno et al. |
| 5,169,243 A | 12/1992 | Takahashi et al. |
| 5,210,781 A | 5/1993 | Ono et al. |
| 5,322,369 A | 6/1994 | Kataoka et al. |
| 5,384,819 A | 1/1995 | Ono |
| 5,490,021 A | 2/1996 | Muller et al. |
| 5,583,907 A | 12/1996 | Ono et al. |
| 5,659,445 A | 8/1997 | Yoshida et al. |
| 5,668,849 A | 9/1997 | Sugiura et al. |
| 5,770,906 A | 6/1998 | Hazelton et al. |
| 5,838,763 A | 11/1998 | Hiller et al. |
| 5,969,448 A * | 10/1999 | Liu et al. .................... 310/90 |
| 6,040,648 A | 3/2000 | Kawawada et al. |
| 6,069,768 A * | 5/2000 | Heine et al. ............ 360/99.08 |
| 6,072,660 A * | 6/2000 | Teshima ................. 360/99.08 |
| 6,292,328 B1 | 9/2001 | Rahman et al. |
| 6,339,270 B1 | 1/2002 | Ichiyama |

* cited by examiner

Primary Examiner—Robert S. Tupper
(74) Attorney, Agent, or Firm—Schulte Roth & Zabel, LLP; Joel E. Lutzker; Anna Vishev

(57) ABSTRACT

A spindle motor for use in a disk drive including a shaft and a bearing sleeve. The shaft has a larger diameter section and a smaller diameter section with a step formed therebetween. The bearing sleeve has a central cylindrical opening, the shaft being inserted into the central cylindrical opening. A bearing gap is formed between the shaft and the bearing sleeve, the bearing gap being filled with lubricating fluid. A first hydrodynamic thrust bearing is formed in the area of the step. A hydrodynamic radial bearing is formed in the area of the larger diameter section of said shaft.

8 Claims, 4 Drawing Sheets

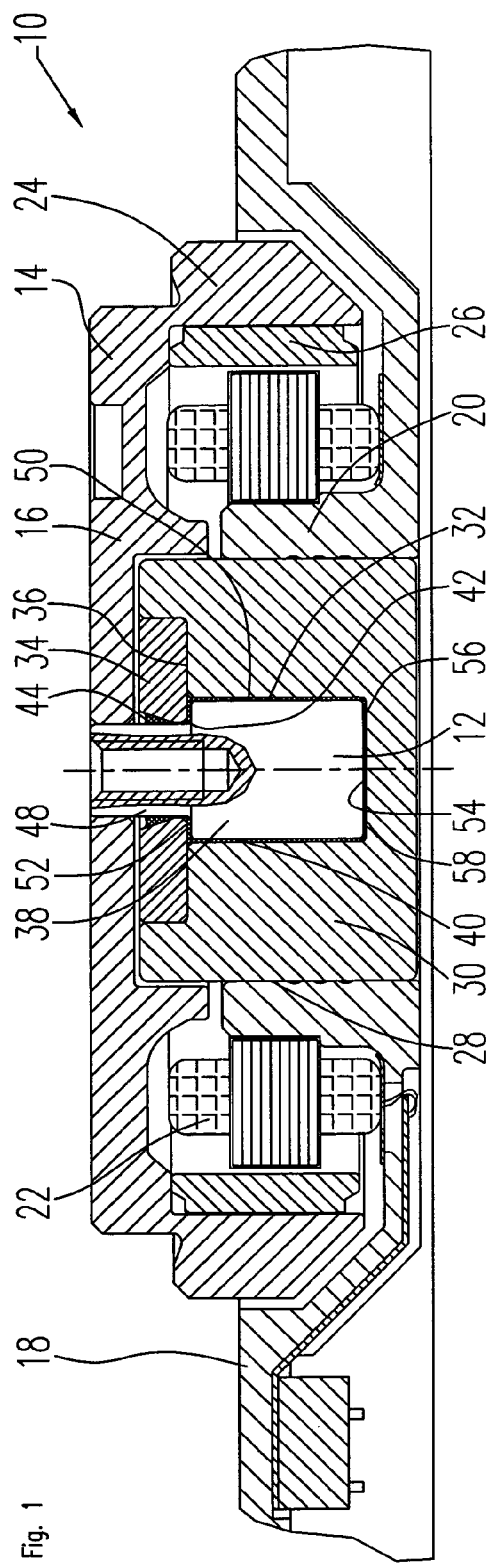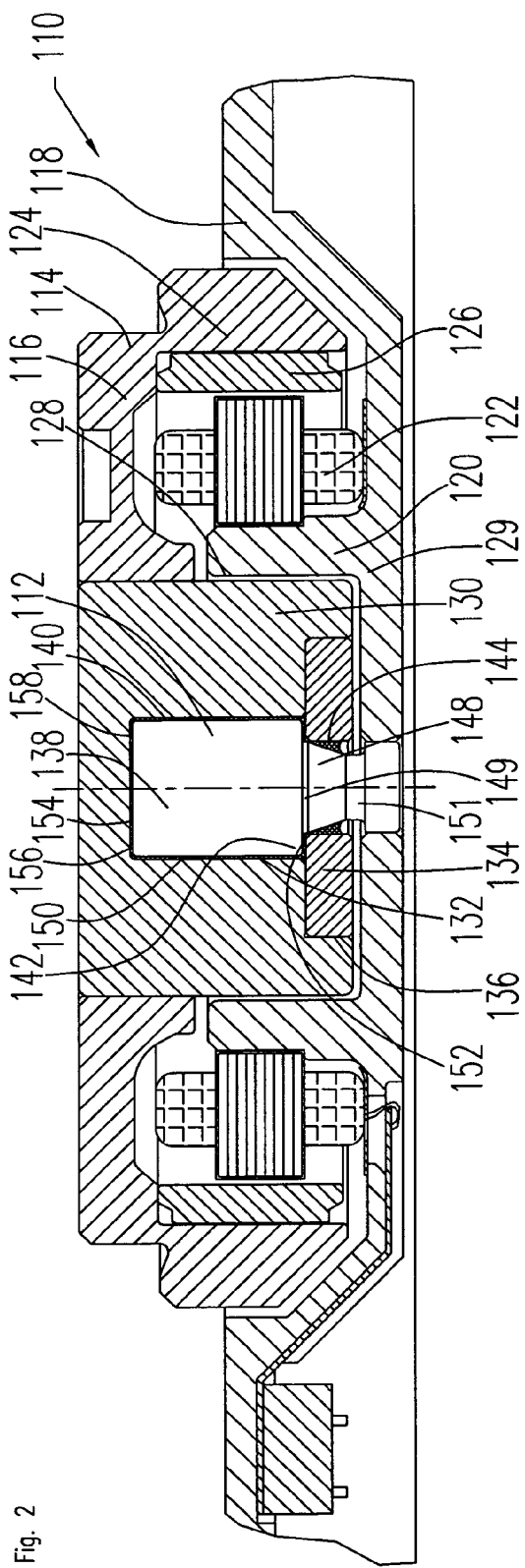

LOW POWER SPINDLE MOTOR WITH A FLUID DYNAMIC SPOOL BEARING

CROSS-REFERENCE TO RELATED APPLICATIONS

This application claims all rights of priority to U.S. Provisional Patent Application Ser. No. 60/363,821, filed Mar. 12, 2002 (pending) and German Patent Application Ser. No. DE 102 37 848.7, filed Aug. 19, 2002 (pending).

FIELD OF THE INVENTION

The following invention relates to electronic spindle motors of the type used in disk drives and in particular relates to improvements in fluid bearings for such motors.

BACKGROUND OF THE INVENTION

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

Electric spindle motors of the type used in disk drives conventionally rely on ball bearings to support a rotary member, such as a rotating hub, on a stationary member, such as a shaft. Ball bearings are known to wear parts, and in time increased friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat, noise and vibration, all of which are undesirable in a disk drive motor.

Fluid bearings represent a considerable improvement over conventional ball bearings in spindle drive motors. In these types of systems, lubricating fluid, either gas or liquid, functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems.

SUMMARY OF THE INVENTION

It is an object of the present invention to provide a spindle motor with a fluid dynamic spool bearing which saves run-current and, therefore, reduces power consumption of the spindle motor.

In accordance with the invention, a spindle motor for use in a disk drive is provided including a shaft and a bearing sleeve. The shaft has a larger diameter section and a smaller diameter section with a step formed therebetween. The bearing sleeve has a central cylindrical opening, the shaft being inserted into the central cylindrical opening. A bearing gap is formed between the shaft and the bearing sleeve, the bearing gap being filled with lubricating fluid. A first hydrodynamic thrust bearing is formed in the area of the step. A hydrodynamic radial bearing is formed in the area of the larger diameter section of said shaft.

The above and other objects, aspects, features and advantages of the invention will be more readily apparent from the description of the preferred embodiments thereof taken in conjunction with the accompanying drawings.

BRIEF DESCRIPTION OF THE DRAWINGS

The invention is illustrated by way of example and not limitation and the figures of the accompanying drawings in which like references denote like or corresponding parts, and in which:

FIG. 1 is a side cut-away view of an electronic spindle motor having a rotational shaft supported for rotation by at least one journal bearing and at least two thrust bearings, wherein one thrust bearing is located on each side of the journal bearing.

FIG. 2 is a side cut-away view of an electronic spindle motor having a fixed shaft and a rotational bearing sleeve supported for rotation by at least one journal bearing and at least two thrust bearings, wherein one thrust bearing is located on each side of the journal bearing.

DETAILED DESCRIPTION OF THE PREFERRED EMBODIMENTS AND THE DRAWINGS

Figure 3:
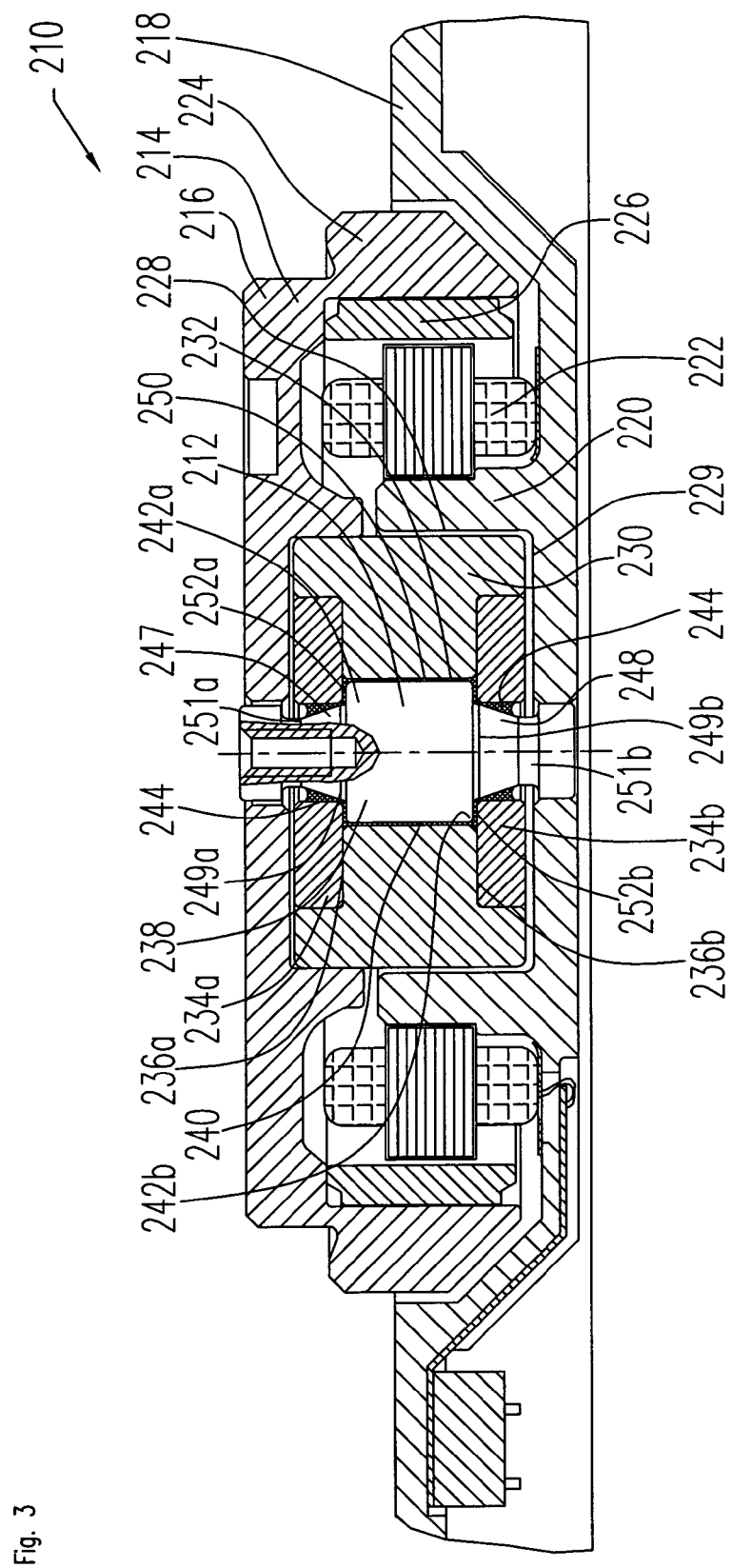
FIG. 3 is a side cut-away view of an electronic spindle motor having a fixed shaft capable of being attached to a top cover (not shown) of the disc drive.

As shown in FIG. 1, a compact electronic spindle motor 10 preferably includes a central rotatable shaft 12 supporting for rotation a rotor 14 having a hub 16. When the motor 10 is used in a disc drive, the hub 16 will support and carry a magnetic disc (not shown) during rotation. The rotor 14 comprises an annular vertical rotor support wall 24, which supports rotor magnets 26. A stator 18 preferably includes an annular vertical stator support wall 20, which supports a plurality of stator windings 22 such that the stator windings are located in opposing relationship with rotor magnets 26. The stator support wall 20 defines an inner cylindrical hole 28. A bearing sleeve 30 is inserted into the inner cylindrical hole 28 and is fixedly mounted therein. The bearing sleeve 30 may be glued to the inner wall of the hole 28.

In the preferred embodiment, the shaft 12 preferably has a larger cylindrical portion 38 and a smaller cylindrical portion 48. An outer diameter of the larger cylindrical portion 38 is greater than an outer diameter of the smaller cylindrical portion 48. A step 42 is formed between the two portions of the shaft. The hub 16 is mounted for rotation on the smaller cylindrical portion 48 of the shaft 12.

In the preferred embodiment, the bearing sleeve 30 has an inner bore 32 with substantially cylindrical walls and an outwardly extended cylindrical opening 36 at its top portion. An inner diameter of the bore 32 is slightly greater than the outer diameter of the larger cylindrical shaft portion 38. The central shaft 12 is preferably inserted into the bore 32 through the top opening 36 and is secured from falling out of the bore by a counter-plate 34, which is placed into the outwardly extended opening 36. The counter-plate 34 is fixed with respect to the bearing sleeve 30. The counter-plate 34 has a central conical bore 44 with an opening on each side of the conical bore. A smaller opening of the conical bore 44 has an inner diameter which is preferably slightly greater than the outer diameter of the smaller cylindrical shaft portion 48 and is smaller than the outer diameter of the larger cylindrical shaft portion 38. Thus, the portion of the counter-plate 34 adjacent to the smaller opening of the conical bore 44 engages the shaft step 42 and prevents the shaft from falling out of the bore 32. The diameter of the larger opening of the conical bore 44 is preferably calculated such that there is an adequate tension between lubricating fluid within the bearing and the wall of the conical bore 44.

As mentioned above, the inner diameter of the bore 32 is slightly greater than the outer diameter of the larger cylindrical shaft portion 38. Therefore, a gap 40 is formed between an outer surface of the shaft 12 and an inner surface of the bore 32. The gap 40 is filled with an appropriate lubricating fluid. During rotation, the lubricating fluid is kept inside the bearing structure by a capillary seal formed by walls of the central conical bore 44 of the counter-plate 34 and the smaller cylindrical shaft portion 48.

Figure 4:
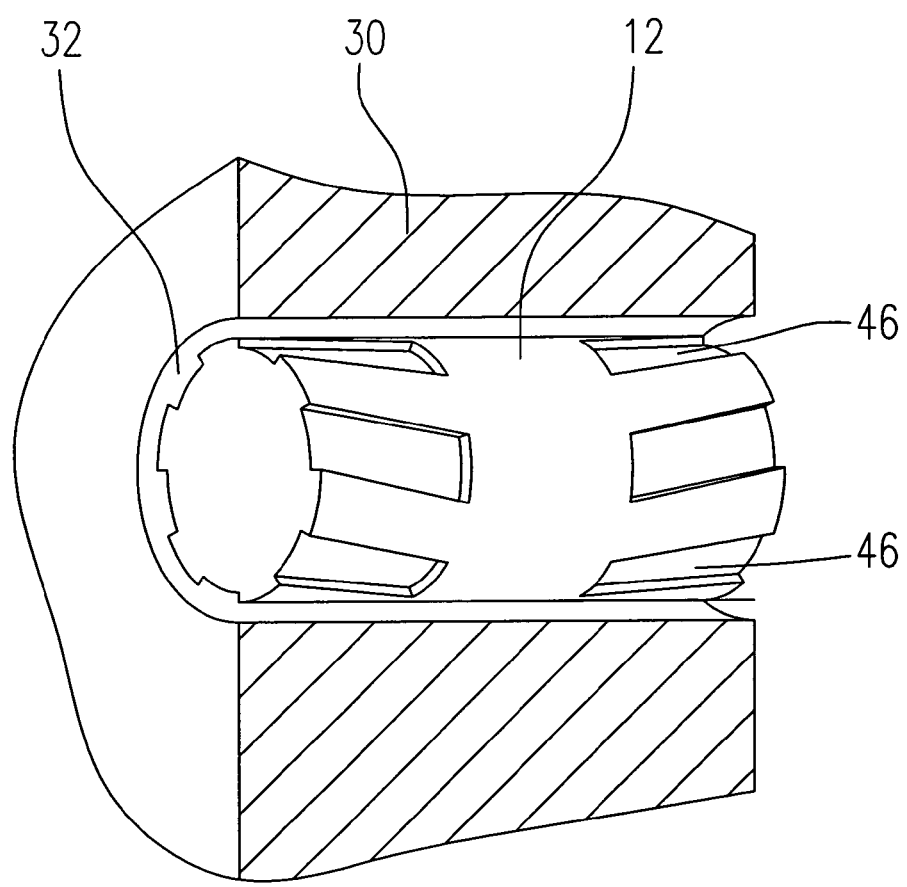
FIG. 4 is a perspective view of the shaft inserted into a bearing sleeve and having a plurality of herringbone grooves.
Figures 5, 6:
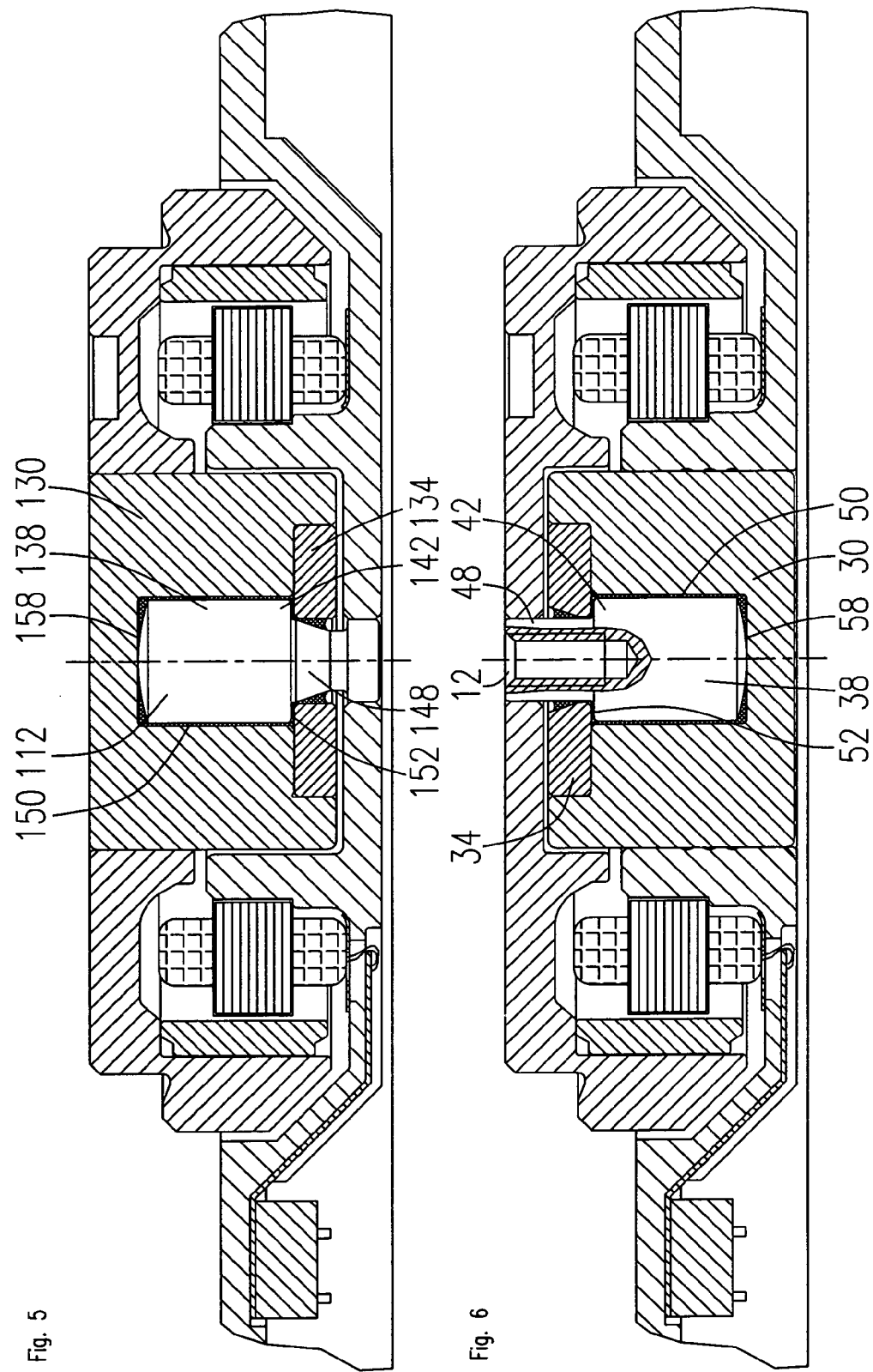
FIG. 5 is a side cut-away view of the embodiment shown in FIG. 2, wherein the top thrust bearing is formed as a pivot bearing.
FIG. 6 is a side cut-away view of the embodiment shown in FIG. 1, wherein the bottom thrust bearing is formed as a pivot bearing.

At least one radial bearing 50 is provided between opposing side walls of the larger cylindrical shaft portion 38 and the bore 32. Dynamic pressure generating grooves 46 may be formed on either the outer surface of the shaft 12, as shown in FIG. 4, or the inner surface of the sleeve 30. A first thrust bearing 52 is provided between opposing sides of the counter-plate 34 and the shaft step 42 by forming herringbone or spiral grooves on either of these opposing sides. A second thrust bearing 58 is preferably provided by forming herringbone or spiral grooves on either the bottom side 54 of the shaft 12 or the bottom wall 56 of the bore 32. As shown in FIG. 6, the second thrust bearing 58 may be formed as a pivot bearing. Thus, as shown in FIG. 1, at least one thrust bearing is formed on each side of the radial bearing 50.

In a typical spindle motor utilizing hydrodynamic thrust bearings, such bearings have to have very high stiffness characteristics. In contrast with currently available designs, the described embodiment of the present invention, where at least one thrust bearing is located on each side of the radial bearing, results in a good motor performance without the high stiffness of the provided thrust bearings. The reduced stiffness of the thrust bearings results in a lower power consumption of the provided spindle motor.

A second embodiment of the spindle motor is shown in FIG. 2. In accordance with the second embodiment, the compact electronic spindle motor 110 preferably includes a bearing sleeve 130 supporting for rotation a rotor 114 having a hub 116. Similarly to the first embodiment, when the motor 110 is used in a disc drive, the hub 116 will support and carry a magnetic disc (not shown) during rotation. The rotor 114 comprises an annular vertical rotor support wall 124, which supports rotor magnets 126. A stator 118 preferably includes an annular cup-shaped stator support 120, which supports a plurality of stator windings 122 such that the stator windings are located in opposing relationship with rotor magnets 126. The annular cup-shaped stator support 120 defines an inner cylindrical hole 128 with a bottom wall 129. A central shaft 112 is fixedly mounted on the bottom wall 129 of the inner cylindrical hole 128. The central shaft 112 may be press-fit into the bottom wall 129.

In the second preferred embodiment, the central shaft 112 preferably has a cylindrical portion 138 and a conical portion 148. The conical portion 148 preferably has a bottom side 151 with a smaller outer diameter and a top side 149 with a larger outer diameter. The top side 149 of the conical portion 148 is preferably located adjacently to the cylindrical portion 138 of the shaft 112. An outer diameter of the cylindrical portion 138 is greater than the larger outer diameter of the top side 149. Therefore, a step 142 is formed between the two portions of the shaft.

In the second preferred embodiment, the bearing sleeve 130 has an inner bore 132 with substantially cylindrical walls and an outwardly extended cylindrical opening 136 at its top portion. An inner diameter of the bore 132 is slightly greater than the outer diameter of the cylindrical shaft portion 138. The central shaft 112 is preferably inserted into the bore 132 through the top opening 136 and is secured from falling out of the bore by a counter-plate 134, which is placed into the outwardly extended opening 136. The counter-plate 134 is fixed with respect to the bearing sleeve 130. The counter-plate 134 has a central cylindrical bore 144. The central cylindrical bore 144 has an inner diameter which is preferably slightly greater than the larger outer diameter of the top side 149 of the conical shaft portion 148 and is smaller than the outer diameter of the cylindrical shaft portion 138. Thus, the portion of the counter-plate 134 adjacent to the top side 149 of the conical shaft portion 148 engages the shaft step 142 and prevents the shaft from falling out of the bore 132. The smaller outer diameter of the bottom side 151 of the conical shaft portion 148 is preferably calculated such that there is an adequate tension between lubricating fluid filling the bearing and the wall of the conical shaft portion 148.

As mentioned above, the inner diameter of the bore 132 is slightly greater than the outer diameter of the cylindrical shaft portion 138. Therefore, a gap 140 is formed between an outer surface of the shaft 112 and an inner surface of the bore 132. The gap 140 is filled with an appropriate lubricating fluid. During rotation, the lubricating fluid is kept inside the bearing structure by a capillary seal formed by walls of the central cylindrical bore 144 of the counter-plate 134 and the conical shaft portion 148.

At least one radial bearing 150 is provided between opposing side walls of the cylindrical shaft portion 138 and the bore 132. Similarly to the first described embodiment, dynamic pressure generating grooves may be formed on either the outer surface of the shaft 112 or the inner surface of the sleeve 130. A first thrust bearing 152 is provided between opposing sides of the counter-plate 134 and the shaft step 142 by forming herringbone or spiral grooves on either one of these opposing sides. A second thrust bearing 158 is preferably provided by forming herringbone or spiral grooves on either the top side 154 of the shaft 112 or the bottom wall 156 of the bore 132. As shown in FIG. 5, the second thrust bearing 158 may be formed as a pivot bearing. Thus, as shown in FIG. 2, at least one thrust bearing is formed on each side of the radial bearing 150.

Similarly to the first embodiment, the described second embodiment of the spindle motor having at least one thrust bearing located on each side of the radial bearing, results in a good motor performance without the high stiffness of the provided thrust bearings. The reduced stiffness of the thrust bearings results in a lower power consumption of the provided spindle motor.

A third preferred embodiment of the present invention is shown in FIG. 3. In accordance with the third embodiment, the compact electronic spindle motor 210 preferably includes a bearing sleeve 230 supporting for rotation a rotor 214 having a hub 216. Similarly to the above embodiments, when the motor 210 is used in a disc drive, the hub 216 will support and carry a magnetic disc (not shown) during rotation. The rotor 214 comprises an annular vertical rotor support wall 224, which supports rotor magnets 226. A stator 218 preferably includes an annular cup-shaped stator support 220, which supports a plurality of stator windings 222 such that the stator windings are located in opposing relationship with rotor magnets 226. The annular cup-shaped stator support 220 defines an inner cylindrical hole 228 with a bottom wall 229. A central shaft 212 is fixedly mounted on the bottom wall 229 of the inner cylindrical hole 228. The central shaft 212 may be press-fit into the bottom wall 229 and may be further secured in a top cover (not shown) of the provided disc drive. Although this top-cover attachment of the shaft is not currently utilized with 2.5" disc drives, it may be utilized with the presently provided motor because of the motor's low power consumption.

In the third embodiment, the central shaft 212 preferably has a cylindrical portion 238, a top conical portion 247 and a bottom conical portion 248. Each conical portion 247, 248 preferably has a smaller diameter side 251a, 251b and a larger diameter side 249a, 249b, respectively. Larger diameter sides 249a and 249b of conical portions 247 and 248 are preferably located adjacently to the cylindrical portion 238 of the shaft 212. An outer diameter of the cylindrical portion 238 is greater than outer diameters of sides 249a and 249b. Therefore, steps 142a and 142b are formed between the cylindrical portion 238 and two conical portions of the shaft 212.

In the third preferred embodiment, the bearing sleeve 230 has an inner bore 232 with substantially cylindrical walls and two outwardly extended cylindrical openings 236a and 236b. The cylindrical opening 236a is preferably formed at the top portion of the inner bore 232. The cylindrical opening 236b is preferably formed at the bottom portion of the inner bore 232. An inner diameter of the bore 232 is slightly greater than the outer diameter of the cylindrical shaft portion 238. The central shaft 212 is inserted into the bore 232 through either the top opening 236a or the bottom opening 236b and is secured from falling out of the bore by two counter-plates 234a and 234b, which are placed into their corresponding outwardly extended openings 236a and 236b, respectively. Counter-plates 234a and 234b are fixed with respect to the bearing sleeve 230. Each counter-plate 234a, 234b has a central cylindrical bore 244. The central cylindrical bore 244 of the counter-plate 234a, 234b has an inner diameter which is slightly greater than the outer diameter of the larger diameter side 249a, 249b of the corresponding conical shaft portion 247, 248. The inner diameter of the bore 244 is also smaller than the outer diameter of the cylindrical shaft portion 238. Thus, portions of counter-plates 234a, 234b adjacent to larger diameter sides 249a, 249b of conical shaft portions 247, 248 engage corresponding shaft steps 242a, 242b and prevent the shaft from falling out of the bore 232. Smaller outer diameters of smaller diameter sides 251a, 251b of conical portions 247 and 248, respectively are preferably determined such that there is an adequate surface tension between lubricating fluid filling the bearing and walls of the two conical shaft portions 247 and 248.

As mentioned above, the inner diameter of the bore 232 is slightly greater than the outer diameter of the cylindrical shaft portion 238. Therefore, a gap 240 is formed between an outer surface of the shaft 212 and an inner surface of the bore 232. The gap 240 is filled with an appropriate lubricating fluid. During rotation, the lubricating fluid is kept inside the bearing structure by capillary seals formed by walls of the central cylindrical bore 244 of counter-plates 234a and 234b and conical shaft portions 247 and 248, respectively.

At least one radial bearing 250 is provided between opposing side walls of the cylindrical shaft portion 238 and the bore 232. Similarly to the first described embodiment, dynamic pressure generating herringbone grooves may be formed on either the outer surface of the shaft 212 or the inner surface of the sleeve 230. A first thrust bearing 252a is provided between opposing sides of the counter-plate 234a and the shaft step 242a by forming herringbone or spiral grooves on either one of these opposing sides. A second thrust bearing 252b is provided between opposing sides of the counter-plate 234b and the shaft step 242b by forming herringbone or spiral grooves on either one of these opposing sides. Thus, as shown in FIG. 3, at least one thrust bearing is formed on each side of the radial bearing 250.

Similarly to the above described embodiments, the third embodiment of the spindle motor having at least one thrust bearing located on each side of the radial bearing, results in a good motor performance without the high stiffness of the provided thrust bearings. The reduced stiffness of the thrust bearings results in a lower power consumption of the provided spindle motor.

The disclosed invention is particularly useful if utilized in connection with a 2.5" disc drive. However, the invention may be used with other spindle motors as well.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A spindle motor for use in a disk drive comprising:
   a shaft having a larger diameter section and a smaller diameter section with a step formed therebetween;
   a bearing sleeve having a central cylindrical opening, said shaft being inserted into said central cylindrical opening;
   a bearing gap formed between said shaft and said bearing sleeve, said bearing gap being filled with lubricating fluid; and
   a counter plate sealing said central cylindrical opening of said bearing sleeve, said counter plate being in an opposing relationship with said step;
   wherein a first hydrodynamic thrust bearing is formed between said step and said counter plate, wherein a hydrodynamic radial bearing is formed in the area of said larger diameter section of said shaft, wherein one end of said shaft is enclosed by said bearing sleeve, and wherein a second hydrodynamic thrust bearing is formed at said enclosed end of said shaft, such that said hydrodynamic radial bearing is located between said first hydrodynamic thrust bearing and said second hydrodynamic thrust bearing.

2. The spindle motor according to claim 1, wherein said second hydrodynamic thrust bearing is a pivot bearing.

3. The spindle motor according to claim 1, wherein a tapered capillary seal is formed at an open end of said counter plate, said tapered capillary seal sealing said lubricating fluid in said bearing gap.

4. The spindle motor according to claim 1, wherein said shaft is a rotational component of said spindle motor.

5. A disk drive having a spindle motor, the spindle motor comprising:
- a shaft having a larger diameter section and a smaller diameter section with a step formed therebetween;
- a bearing sleeve having a central cylindrical opening, said shaft being inserted into said central cylindrical opening;
- a bearing gap formed between said shaft and said bearing sleeve, said bearing gap being filled with lubricating fluid; and
- a counter plate sealing said central cylindrical opening of said bearing sleeve, said counter plate being in an opposing relationship with said step;

wherein a first hydrodynamic thrust bearing is formed between said step and said counter plate, wherein a hydrodynamic radial bearing is formed in the area of said larger diameter section of said shaft, wherein one end of said shaft is enclosed by said bearing sleeve, and wherein a second hydrodynamic thrust bearing is formed at said enclosed end of said shaft, such that said hydrodynamic radial bearing is located between said first hydrodynamic thrust bearing and said second hydrodynamic thrust bearing.

6. The disk drive according to claim 5, wherein said second hydrodynamic thrust bearing is a pivot bearing.

7. The disk drive according to claim 5, wherein a tapered capillary seal is formed at an open end of said counter plate, said tapered capillary seal sealing said lubricating fluid in said bearing gap.

8. The disk drive according to claim 5, wherein said shaft is a rotational component of said spindle motor.

* * * * *